(12) United States Patent
Zalite et al.

(10) Patent No.: US 7,392,698 B2
(45) Date of Patent: Jul. 1, 2008

(54) AUTOMATIC FLOW MEASURING DEVICE

(75) Inventors: Martin W. Zalite, Mahwah, NJ (US); Larry P. Mesmer, Clifton, NJ (US)

(73) Assignee: Control & Power Systems, Inc., Fairfield, NJ (US)

(*) Notice: Subject to any disclaimer, the term of this patent is extended or adjusted under 35 U.S.C. 154(b) by 0 days.

(21) Appl. No.: 11/606,580

(22) Filed: Nov. 30, 2006

(65) Prior Publication Data
US 2007/0169546 A1    Jul. 26, 2007

Related U.S. Application Data

(60) Provisional application No. 60/740,717, filed on Nov. 30, 2005.

(51) Int. Cl.
*G01F 3/26* (2006.01)
(52) U.S. Cl. ...................................................... 73/220
(58) Field of Classification Search ............. 73/220, 73/271, 249; 137/557, 554; 705/413; 377/21; 708/623
See application file for complete search history.

(56) References Cited

U.S. PATENT DOCUMENTS 5,226,447 A * 7/1993 Burley .................. 137/554
2003/0009428 A1 * 1/2003 Barbe .................. 705/413

\* cited by examiner

*Primary Examiner*—Jewel V Thompson
(74) *Attorney, Agent, or Firm*—Gerald T. Bodner

(57) ABSTRACT

An automatic flow measuring device is used in an industry where accuracy in dispensing of liquid is necessary. It is fully automatic in nature and is used with a PLC (programmable logic controller) to give the system intelligence and reporting capability. The automatic flow measuring device for measuring fluid flow includes an automatically operated valve, a tee connector operatively coupled to the automatically operated valve, an elongated member defining a measuring chamber coupled to the tee connector, at least a first fluid level sensor mounted on the elongated member at a first position thereon and a second fluid level sensor mounted on the elongated member at a second position thereon. The first and second sensors are preferably electronic and send signals to the PLC which opens and closes the automatically operated valve.

13 Claims, 1 Drawing Sheet

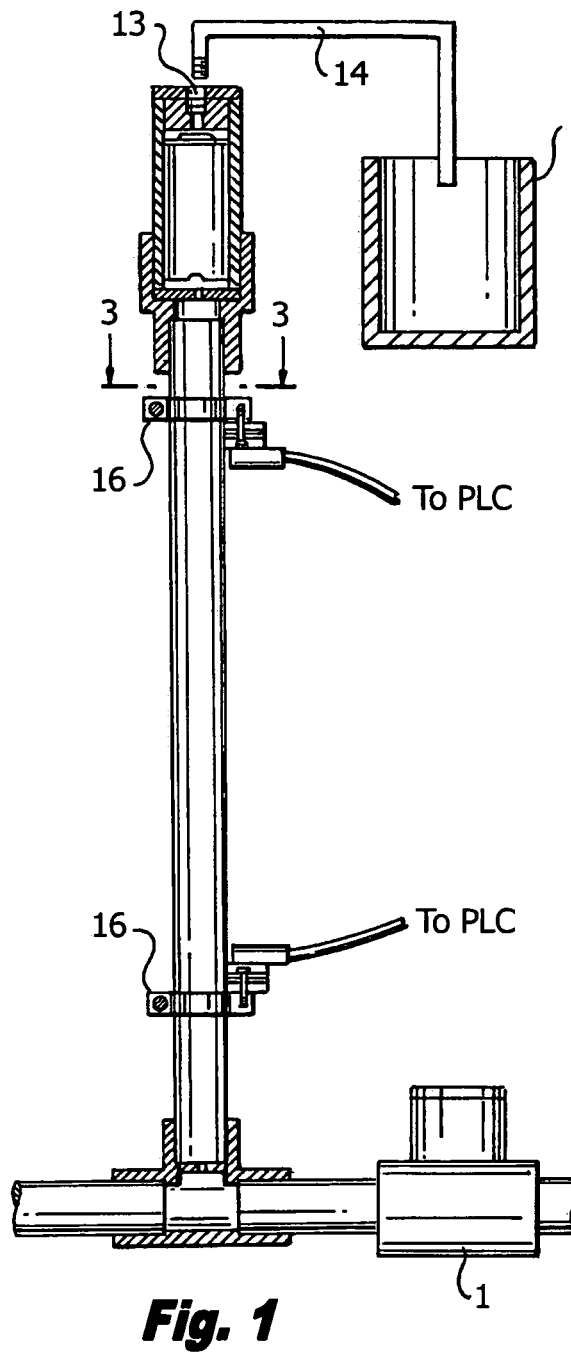
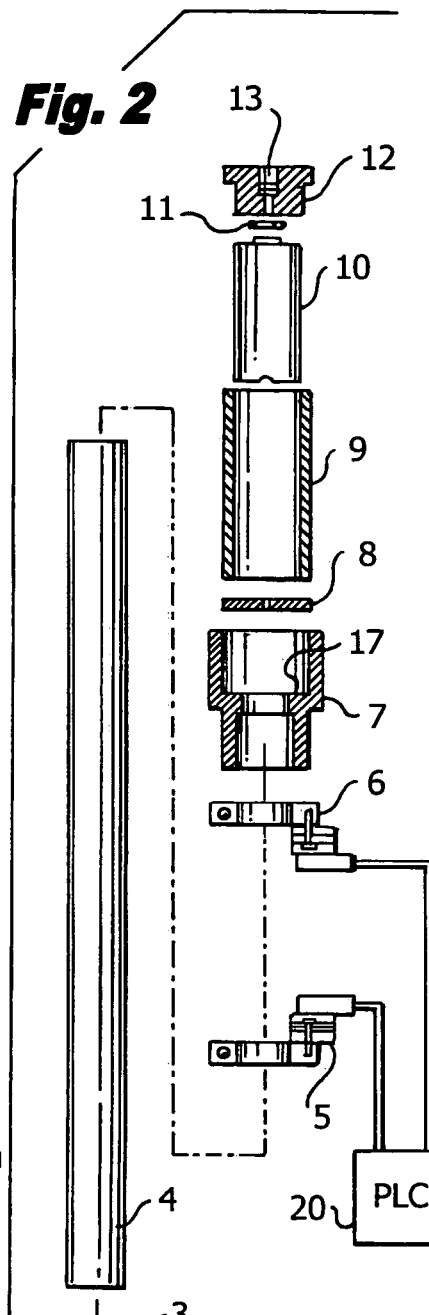
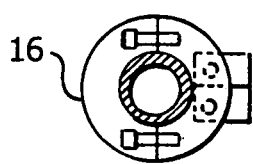

AUTOMATIC FLOW MEASURING DEVICE

CROSS REFERENCE TO RELATED APPLICATION

This application is related to U.S. Provisional Application Ser. No. 60/740,717 filed on Nov. 30, 2005, and entitled "Automatic Flow Measuring Device", the disclosure of which is incorporated herein by reference and on which priority is hereby claimed.

BACKGROUND OF THE INVENTION

1. Field of the Invention

The present invention relates to fluid flow measurement devices, and more particularly relates to fluid flow measurement devices employing a calibration cylinder.

2. Description of the Prior Art

Traditionally, calibration cylinders are manual devices whereby an operator diverts the flow into a calibration tube and closes off a valve from the main flow causing the calibration cylinder to act as the main source of flow. Using a timing device, the operator notes the time it takes for the graduated calibration cylinder to empty and mathematically converts this time to a rate of flow. Inherently, the problems are operator error in the timing and a lack of consistency thereof. Additionally, as a manual system there is no possibility of automatic flow metering or totalizing. Furthermore, such systems have been "open" to the atmosphere and the overflow therefrom is inconveniently pumped back to the bulk feed tank.

OBJECTS AND SUMMARY OF THE INVENTION

It is an object of the present invention to provide an automatic flow measuring device to be used with industrial dispensing products requiring precise and accurate measurements.

It is another object of the present invention to provide an automatic flow measuring device utilizing a programmable logic controller to fully automate the flow calibration process.

It is a further object of the present invention to provide an automatic flow measuring device capable of being continuously remotely monitored by operators, quality control, and suppliers.

It is yet a further object of the present invention to provide an automatic flow measuring device which includes a floating check valve as a fail safe mechanism.

It is yet another object of the present invention to provide an automatic flow measuring device which includes a closed collection tank to capture overflow product.

The inventors have developed a closed fully automatic metering system that in conjunction with a Programmable Logic Controller or other suitable programmable controller provides feedback for volumetric flow monitoring and totalizing of quantities pumped. The system can be monitored remotely by the operators, quality control and suppliers as well, to ensure proper operation of the equipment and by suppliers to ensure that chemicals are ordered as needed by the factory. Optionally, the system may be fitted with a floating check valve to contain chemicals within the calibration chamber should any part of the system fail. The system may also be fitted with a closed collection tank remotely located on the machine.

In accordance with one form of the present invention, an automatic flow measuring device for measuring fluid flow preferably includes an automatically operated valve, a tee connector operatively coupled to the automatically operated valve, an elongated member defining a measuring chamber coupled to the tee connector, at least a first fluid level sensor mounted on the elongated member at a first position thereon and a second fluid level sensor mounted on the elongated member at a second position thereon. The first and second sensors are preferably electronic and send signals to a programmable logic controller which opens and closes the automatically operated valve.

The automatic flow measuring device of the present invention operates as follows: fluid from a bulk feed tank passes through the automatically operated valve and into the tee connection, where fluid flow splits as it is continuously pumped. Part of the flow diverts up into the measuring chamber defined by the elongated member. Air in the measuring chamber is vented through the top of the chamber where there may be installed an overflow prevention valve assembly forming part of the preferred form of the present invention. The balance of the fluid flow continues on its original path. As the measuring chamber of the elongated member fills, the meniscus that forms on top of the fluid passes the lower sensor and rises in the measuring chamber until it crosses the upper sensor at which time the programmable logic controller closes the automatically operated valve, restricting flow to only that fluid which is coming from the measuring or calibration chamber.

As the liquid level falls in the measuring chamber, its meniscus again crosses the lower sensor, which signals the programmable logic controller to trigger the automatically operated valve to reopen and again provide flow from the bulk feed tank. The time required for the measuring chamber to empty (that is, with the meniscus crossing the lower sensor) is recorded and calculated as volumetric flow. This flow rate may be used to regulate the operation of the pumps to calibrate the flow and to provide for replenishment of the bulk feed tanks.

These and other objects, features and advantages of the present invention will be apparent from the following detailed description of illustrative embodiments thereof, which is to be read in connection with the accompanying drawings.

BRIEF DESCRIPTION OF THE DRAWING

FIG. 1 is a longitudinal cross-sectional view of an automatic flow measuring device formed in one of many possible configurations in accordance with the present invention.

FIG. 2 is an exploded view in longitudinal cross-section of the automatic flow measuring device representative of the present invention shown in FIG. 1. The identical functionality may be achieved by machining the described configuration from solid blocks of material or other equivalent embodiments.

FIG. 3 is a top plan view of a split ring clamp which is preferably used to adjustably mount upper and lower sensors of the automatic flow measuring device formed in accordance with the present invention.

DETAILED DESCRIPTION OF THE PREFERRED EMBODIMENTS

FIGS. 1, 2 and 3 of the drawing show an automatic flow measuring device formed in accordance with the present invention. Fluid flows in the direction indicated by the arrow depicted in FIG. 1. Fluid from a bulk feed tank (not shown) or other fluid source is provided to the input port of an automatically operated valve 1, such as a solenoid valve, whose output port is connected to the input port of a fluid diverter or tee connector 2. The tee connector 2 has a main flow output port and a diversion output port. The flow of fluid splits in the tee connector 2 as it is continuously pumped, and part of the flow diverts through the diversion output port, the remainder flowing through the main output port of the tee connector 2.

A measuring chamber 4, which is preferably defined by an elongated tubular or cylindrical structure with an axial bore formed therethrough, and which also has a sidewall which is preferably clear or transparent, either entirely or over portions thereof, the purpose of which will become apparent in the following description, has one axial end thereof (e.g., the bottom end) coupled to the diversion output port of the tee connector 2. Fluid diverted through the tee connector 2 through the diversion output port flows into the measuring chamber 4. Air in the chamber 4 is vented through the opposite (e.g., top) axial end of the chamber, where there is fitted thereon an overflow prevention valve assembly that includes components 7-12, including an upper seal 12 of the overflow prevention valve assembly, all of which will be described in greater detail. As mentioned previously, the balance of the flow of fluid which is not diverted through the diversion output port of the tee connector continues on its original path through the main output port of the tee connector 2.

The automatic flow measuring device of the present invention further includes at least two fluid sensors or detectors, in particular, a lower sensor or setpoint 5 and an upper sensor or setpoint 6. The upper and lower chamber fluid level sensors 6, 5 are operatively coupled, preferably electronically, to a programmable logic controller (PLC) 20 or other computer circuit, also forming part of the present invention. The upper and lower chamber fluid level sensors 6, 5 detect the level of the fluid in the measurement chamber 4, and in particular, the meniscus that forms on top of the fluid, which rises and falls in the measuring chamber 4 defined by the elongated cylindrical tube. The upper and lower chamber fluid level sensors 6, 5, may be of many different types and formed from different technologies, such as optical, impedance, capacitance, ultrasonic, mass sensing or from other suitable technologies. The specific sensing device used in the present invention for upper and lower chamber fluid level sensors 6, 5 is chosen to match each particular application. Alternatively, a single level sensing device, employing ultrasonic, pressure, optical, capacitance or other suitable technology, may be mounted on the chamber and be used to determine liquid level in the measuring chamber 4.

As the tube defining the measuring chamber fills with fluid, the meniscus that forms on top of the fluid passes the lower sensor or setpoint 5 and rises in the chamber 4 until it crosses the upper sensor or setpoint 6, at which time the PLC 20 closes the automatically operated valve 1, restricting fluid flow to only that fluid which is coming from the calibration or measuring chamber 4. As the liquid level falls in the measuring chamber 4, its meniscus again crosses the lower sensor or setpoint 5, thus causing the PLC 20 to trigger the automatically operated valve 1 to reopen and again provide flow of fluid from the bulk feed tank. The time required for the measuring chamber 4 to empty (that is, for the meniscus to cross the lower sensor 5) is recorded and calculated as volumetric flow by the PLC 20. This flow rate may be used to regulate the operation of the pump or pumps to totalize or calibrate fluid flow and to provide for replenishment of the bulk feed tank or tanks.

There are additional features of the automatic flow calibration cylinder of the present invention which will now be described. In particular, in a preferred form of the present invention, an aperture plate 3 having a small bore formed through the thickness thereof is positioned between the diversion output port of the tee connector 2 and the bottom axial end of the elongated cylindrical tube defining the measuring chamber 4. The aperture plate 3 may be used to regulate the rate of flow of fluid into the calibration cylinder defining the measuring chamber 4, or may be used as a pulsation dampener to smooth the rise and fall of fluid within the measuring chamber 4, or the combination of both.

Furthermore, the lower sensor or setpoint 5 and the upper sensor or setpoint 6 may be mounted in fixed first and second positions on the outside surface (or the inside surface) of the elongated cylindrical tube defining the measuring chamber 4, or alternatively, may be mounted on split ring clamps 16 (see FIG. 3) or other such adjustable devices so that the upper and lower sensors 6, 5 can be easily positioned with respect to each other for the purpose of obtaining a specific calibration value. Again, the sidewall of the elongated cylindrical tube is preferably clear or transparent over its entirety or over portions thereof where the upper and lower fluid level sensors 6, 5 are positioned to allow light to pass therethrough, especially if the upper and lower fluid sensors 6, 5, are optical in nature to detect the rise and fall of the meniscus of the fluid in the measuring chamber 4.

Another preferred feature of the automatic flow measuring device of the present invention is an overflow prevention valve assembly, having components 7 through 12, which will be described in greater detail. The overflow prevention valve assembly includes a valve seat 7 in the form of a cylindrical tube which is mounted on the upper axial end of the tube defining the measuring chamber 4. More specifically, the valve seat 7 includes a first axial end having an axial bore formed therein which has an inner diameter that is equal to or slightly greater than the outer diameter of the tube defining the measuring chamber 4 so that the upper axial end of the measuring chamber tube may be received by the axial bore of the first axial end of the valve seat 7. The opposite second axial end of the valve seat 7 also includes an axial bore which communicates with the axial bore of the first axial end, and which has an inner diameter which, preferably, is greater than that of the axial bore of the first axial end to define a supporting shoulder 17 that extends partially radially inwardly of the valve seat, which shoulder supports one or more other components of the overflow prevention valve assembly.

The overflow prevention valve assembly further includes a cylindrical aperture plate 8 having an orifice formed centrally through the thickness thereof. The aperture plate 8 is received by the axial bore of the second end of the valve seat and rests on the shoulder 17 therein. A tubular body 9, defining a portion of the overflow prevention valve assembly (also referred to herein as a "check valve"), has an outer diameter which is equal to or slightly less than the inner diameter of the axial bore of the second axial end of the valve seat so that it is closely received by the axial bore and rests against an axial surface of the aperture plate 8. The tubular body 9 includes a bore formed axially therein, which communicates with the orifice formed through the thickness of the aperture plate 8. The aperture plate 8 is provided to slow the flow of fluid into the axial bore of the tubular body 9 forming part of the overflow prevention valve assembly or check valve.

The overflow prevention valve assembly further includes a cylindrical floating member which has a closed top axial end and an opposite open bottom axial end that communicates with an axial bore formed in the floating member 10. The outer diameter of the floating member 10 is slightly less than the inner diameter of the tubular member 9 which defines the axial bore therein so that the floating member 10 may be received by the axial bore of the tubular member 9 and moveable axially therein. There is preferably a slight spacing between the outer surface of the sidewall defining the floating member 10 and the inner surface of the sidewall defining the tubular body 9 to allow air to escape from the measuring chamber 4 therebetween, and to allow air to enter the measuring chamber 4 therethrough, when the level of the fluid in the measuring chamber 4 rises and falls, respectively.

An upper seal 12 having an outwardly radially extending flange is mounted on the upper axial end of the tubular body 9 to form a seal therewith, with an exposed surface of the flange resting on the upper edge of the tubular body 9. The upper seal 12 includes a bore formed axially through the thickness thereof, which allows air from the measuring chamber 4 to vent therethrough.

A seal, such as an O-ring 11, is mounted on the upper axial end of the floating member 10, and has a diameter which is greater than that of the axial bore of the valve seal 12 situated at the lower surface of the valve seal so that the O-ring 11 surrounds the bore and effectively prevents fluid from escaping therethrough when the floating member 10 is pressed up against the lower surface of the upper seal 12.

If any portion of the automatic flow measuring device of the present invention should fail and allow an uncontrolled flow of fluid to pass beyond the upper sensor or setpoint 6, the fluid will first pass through the aperture plate 8 situated in the base or lower portion of the overflow prevention valve assembly. The aperture plate 8 slows the flow of fluid into the tubular body 9 and through the prevention valve assembly or check valve. At this point, the fluid begins to fill the axial bore of the tubular body 9 of the valve assembly, and the column of air trapped within the axial bore of the floating member 10 of the valve lifts or floats the floating member 10 so that the O-ring 11 comes in contact with the bottom surface of the upper seal 12 and prevents the fluid from flowing through the bore (i.e., the air vent) formed in the upper seal 12. The valve is designed in such a way that the greater the pressure from the water column, the tighter the valve seals.

The axial bore of the upper seal 12, in proximity to the upper surface thereof, is preferably formed with a pipe thread 13, so that additional piping or tubing 14 can be attached to the upper seal to vent vapors and liquid back to the storage or bulk feed tank or another similar vessel or to an external receiving device 15. Although the check valve assembly described herein may be mounted directed on top of the tube defining the measuring chamber 4, it may also be mounted on the measuring chamber tube at any other convenient, offset position.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An automatic flow measuring device which measures at least one of the rate of flow and volume of a fluid flowing through a conduit from a fluid source, which comprises:
    an automatically operated valve in fluid communication with the conduit through which fluid flows, the valve being operative in at least a first state to allow fluid from the fluid source to flow through the conduit, and a second state to prevent fluid from the fluid source from flowing into the conduit;
    a fluid diverter connector, the fluid diverter connector being in fluid communication with the conduit and having a fluid diversion port through which flows at least a diverted portion of the fluid flowing through the conduit;
    an elongated tubular member having an axial bore formed therein defining a measuring chamber, the elongated tubular member being in fluid communication with the fluid diversion port of the fluid diverter connector to allow the diverted portion of the fluid to flow into the measuring chamber;
    at least a first fluid level sensor and a second fluid level sensor, the first fluid level sensor being situated adjacent the elongated tubular member in a first position along the longitudinal length thereof, the second fluid level sensor being situated adjacent the elongated tubular member in a second position along the longitudinal length thereof, the second position being different from the first position, the at least first and second fluid level sensors detecting the level of the diverted portion of the fluid in the measuring chamber and respectively generating first and second signals in response thereto;
    at least one of a programmable logic controller and a computer circuit, the at least one of a programmable logic controller and a computer circuit being responsive to the first and second signals generated by the first and second fluid level detectors and calculating at least one of the rate of flow of fluid through the conduit and the volume of fluid flowing through the conduit, the at least one of a programmable logic controller and a computer circuit generating a control signal, the automatically operated valve being operable in the at least first state and the second state in response to the control signal.

2. An automatic flow measuring device as defined by claim 1, which further comprises:
    an aperture plate, the aperture plate having an opening formed axially through the thickness thereof, the aperture plate being situated between the fluid diversion port of the fluid diverter connector and the elongated tubular member and in fluid communication with the measuring chamber.

3. An automatic flow measuring device as defined by claim 1, wherein the elongated tubular member includes at least portions thereof which are light transmissible, the light transmissible portions being situated at the first and second positions at which the first and second fluid level sensors are situated along the longitudinal length of the elongated tubular member; and wherein the at least first and second fluid level sensors are optical sensors.

4. An automatic flow measuring device as defined by claim 1, wherein the at least first and second fluid level sensors are adjustably mounted on the elongated tubular member.

5. An automatic flow measuring device as defined by claim 1, wherein the elongated tubular member includes means defining an air vent in fluid communication with the measuring chamber to at least allow air within the measuring chamber to pass therethrough.

6. An automatic flow measuring device as defined by claim 5, wherein the means defining an air vent includes a first seal having a bore formed axially through the thickness thereof, the elongated tubular member having a first axial end on which the first seal is mounted, the axial bore of the first seal being in fluid communication with the measuring chamber to at least allow air within the measuring chamber to pass therethrough.

7. An automatic flow measuring device as defined by claim 6, wherein at least a portion of the axial bore of the first seal is threaded; and wherein the automatic flow measuring device further comprises:

an overflow conduit, the overflow conduit including a first axial end which is threadingly received by the threaded portion of the axial bore of the first seal.

8. An automatic flow measuring device as defined by claim 6, which further comprises:

an overflow conduit, the overflow conduit having a first axial end, the first axial end of the overflow conduit being operatively coupled to the first seal, the overflow conduit being in fluid communication with the axial bore of the first seal.

9. An automatic flow measuring device as defined by claim 8, wherein the overflow conduit includes a second axial end situated opposite the first axial end, the second axial end of the overflow conduit being in fluid communication with at least one of a fluid overflow reservoir and the fluid source.

10. An automatic flow measuring device as defined by claim 5, which further comprises:

an overflow prevention valve assembly to selectively prevent fluid flow through the air vent.

11. An automatic flow measuring device as defined by claim 10, wherein the overflow prevention valve assembly includes a floatable member situated within the measuring chamber of the elongated tubular member, the floatable member being selectively floatable on the diverted portion of fluid in the measuring chamber, the floatable member selectively engaging the means defining an air vent to prevent fluid flow through the air vent.

12. An automatic flow measuring device as defined by claim 11, wherein the floatable member includes an air vent seal mounted thereon, the air vent seal selectively engaging the means defining an air vent to prevent fluid flow through the air vent.

13. An automatic flow measuring device as defined by claim 1, wherein the elongated tubular member includes means defining an air vent in fluid communication with the measuring chamber to at least allow air within the measuring chamber to pass therethrough, the air vent defining means including a first seal having a bore formed axially through the thickness thereof, the elongated tubular member having a first axial end on which the first seal is mounted, the axial bore of the first seal being in fluid communication with the measuring chamber to at least allow air within the measuring chamber to pass therethrough; and wherein the automatic flow measuring device further comprises:

an overflow prevention valve assembly to selectively prevent fluid flow through the air vent, the overflow prevention valve assembly including a floatable member situated within the measuring chamber of the elongated tubular member, the floatable member being selectively floatable on the diverted portion of fluid in the measuring chamber, the floatable member having an air vent seal mounted thereon, the air vent seal selectively engaging the first seal and selectively preventing fluid flow through the axial bore of the first seal.

* * * * *